(No Model.)
C. R. ZACHARIAS.
LUGGAGE CARRIER FOR BICYCLES.
No. 302,462. Patented July 22, 1884.
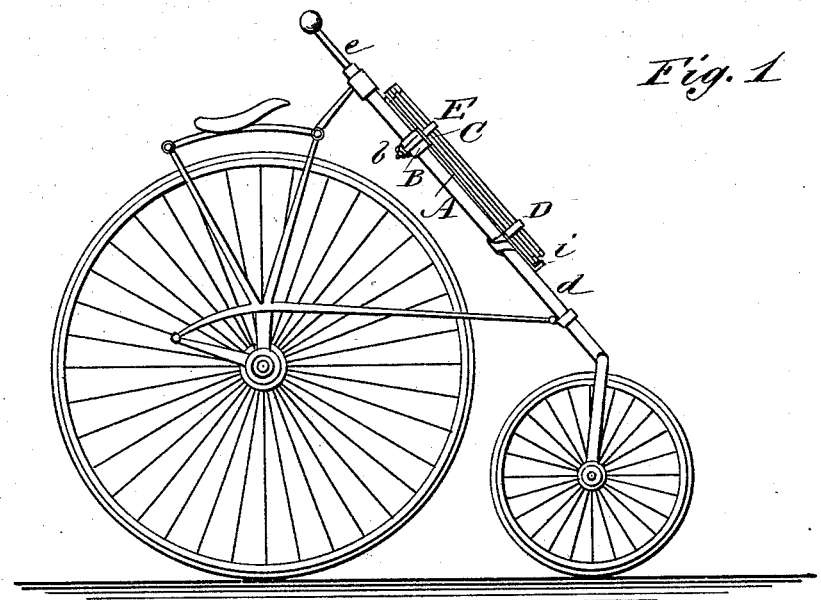
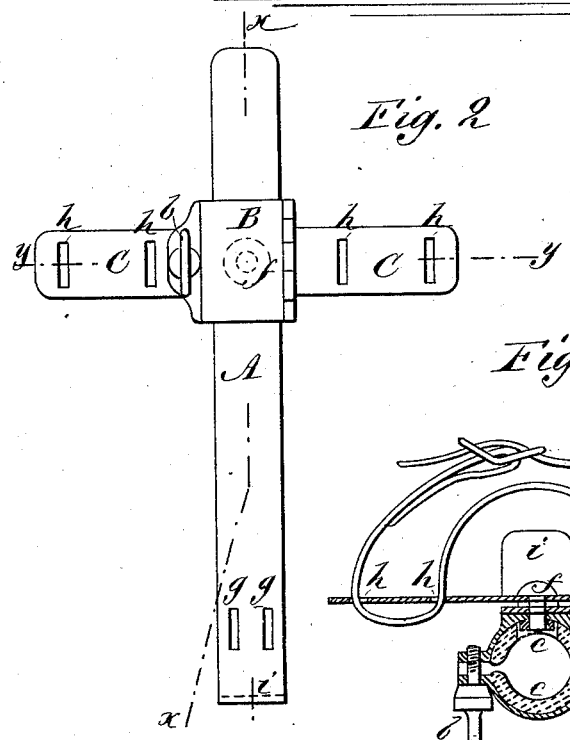
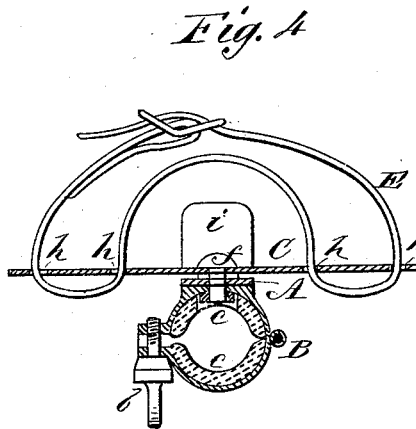
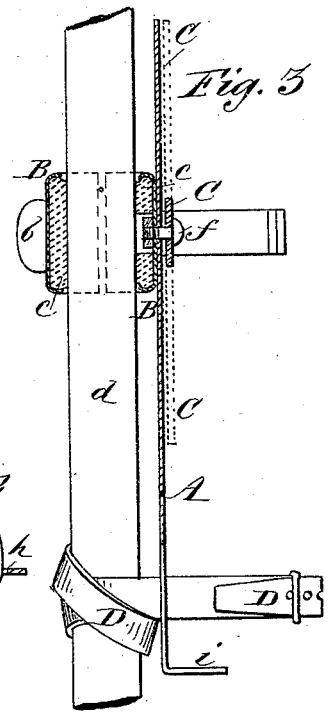
WITNESSES:
C. Neveux
C. Sedgwick
INVENTOR:
C. R. Zacharias
BY Munn & Co.
ATTORNEYS.

UNITED STATES PATENT OFFICE.

CHARLES R. ZACHARIAS, OF NEWARK, NEW JERSEY.

LUGGAGE-CARRIER FOR BICYCLES.

SPECIFICATION forming part of Letters Patent No. 302,462, dated July 22, 1884.

Application filed February 8, 1884. (No model.)

*To all whom it may concern:*

Be it known that I, CHARLES R. ZACHARIAS, of Newark, in the county of Essex and State of New Jersey, have invented a new and Improved Luggage-Carrier for Bicycles, of which the following is a full, clear, and exact description.

This invention consists in a luggage-carrier for bicycles provided with means for its ready attachment to the tube containing the steering-rod of the vehicle and adjustment thereon or detachment therefrom as required, said carrier being composed, mainly, of a narrow longitudinal plate, bar, or strip, and an upper cross plate or strip pivoted to the longitudinal plate and capable of being adjusted into a parallel position with the longitudinal plate, whereby the carrier, when not required to carry luggage, may have both of its strips or plates put into line with the tube of the steering-bar and lie closely thereto and out of the way. It also comprises a screw-hinged clamp on the back of the longitudinal plate or strip for attachment of the carrier to the tube of the steering-rod, straps passing through slots in the strips to hold the luggage in place and to assist in securing the carrier in position, and a foot-rest for the luggage on the carrier, substantially as hereinafter described.

Said luggage-carrier may be used for carrying parcels, books, umbrellas, canes, &c., in line with the tube of the steering rod or bar and in close relation thereto, thus doing away with all objectionable lateral protrusion of said articles.

Reference is to be had to the accompanying drawings, forming a part of this specification, in which similar letters of reference indicate corresponding parts in all the figures.

Figure 1 represents a side elevation of a bicycle with a luggage-carrier constructed in accordance with my invention applied and as carrying certain articles. Fig. 2 is a rear view of the carrier upon a larger scale; Fig. 3, a longitudinal section thereof on the irregular line $x\ x$, Fig. 2; and Fig. 4, a transverse section of the same on the line $y\ y$ in Fig. 2.

A is a flat plate or strip of metal or other suitable material, forming the main or longitudinal piece of the carrier. This strip has attached to its back a divided socket-hinged clamp, B, fastened by a thumb-screw, $b$, and having leather or other padding $c$ on its interior, for holding the carrier by friction on the tube $d$ of the steering-rod $e$. The jaw-like clamp B readily provides for attaching and detaching the carrier to and from its place, and for adjusting it up or down on the tube.

Near the upper end of the plate A, on the face thereof, is pivoted by a screw, $f$, another plate or strip, C, which, by means of the screw or other adjustable fastening, may either be set to occupy a crosswise position relatively to the strip A, as shown by full lines in Figs. 2, 3, and 4, to put the carrier into a spread position for carrying a parcel or other article or articles upon its face in line with the steering-tube $d$, or said plate or strip C may, on suitably manipulating the screw $f$, be set or turned to occupy a position parallel with the strip A and tube $d$, as shown by dotted lines in Fig. 3, when it is not required to use the carrier, and whereby the carrier may be retained on the vehicle ready for use when required without forming any objectionable obstruction. The strips A and C are provided with any number of slots $g\ h$ in them for straps D E, used to hold the baggage on the carrier, to engage with or pass through the lower strap, D, also serving to assist in holding the carrier to its place on the steering-tube $d$.

At the bottom of the strip A may be a foot-piece or projection, $i$, for the lower end of the parcel being carried to rest against. This foot-piece may be hinged so as to shut down on the face of the body of the strip when in the way or not required to be used.

Having thus described my invention, I claim as new and desire to secure by Letters Patent—

1. In a luggage-carrier for bicycles and other like vehicles, the combination of the longitudinal strip or plate A, provided with means for securing it to the vehicle, and a cross strip or plate, C, capable of adjustment into line with the longitudinal plate, substantially as specified.

2. The hinged jaw-clamp B, provided with a tightening-screw, $b$, in combination with the plate or strip A of the carrier and its cross strip or plate C, essentially as described.

3. The plates or strips A C of the carrier, having slots $g$ $h$ in them, in combination with the straps D E, substantially as specified.

4. The longitudinal strip or plate A of the carrier, provided with a foot-rest, $i$, in combination with the pivoted cross strip or plate C, essentially as and for the purpose or purposes set forth.

CHARLES R. ZACHARIAS.

Witnesses:
A. S. ROORBACH,
HOWARD A. SMITH.